(12) United States Patent
Atsushi et al.

(10) Patent No.: US 12,116,079 B2
(45) Date of Patent: Oct. 15, 2024

(54) HYDRAULIC PRESSURE CONTROL UNIT, BRAKE SYSTEM, AND STRADDLE-TYPE VEHICLE

(71) Applicant: Robert Bosch GmbH, Stuttgart (DE)

(72) Inventors: Hiroaki Atsushi, Kanagawa (JP); Kazuki Chiba, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 417 days.

(21) Appl. No.: 17/634,532

(22) PCT Filed: Aug. 17, 2020

(86) PCT No.: PCT/IB2020/057749
§ 371 (c)(1),
(2) Date: Feb. 10, 2022

(87) PCT Pub. No.: WO2021/038377
PCT Pub. Date: Mar. 4, 2021

(65) Prior Publication Data
US 2022/0324533 A1    Oct. 13, 2022

(30) Foreign Application Priority Data

Aug. 29, 2019   (JP) ................................ 2019-156222

(51) Int. Cl.
*B62L 3/02*     (2006.01)
*B60T 8/32*     (2006.01)
(Continued)

(52) U.S. Cl.
CPC ............ *B62L 3/023* (2013.01); *B60T 8/3225* (2013.01); *B60T 8/3685* (2013.01); *B60T 8/42* (2013.01);
(Continued)

(58) Field of Classification Search
CPC .......... B62L 3/023; B60T 8/42; B60T 8/3225; B60T 8/3685; B60T 13/662; B60T 13/686; B62K 19/38
(Continued)

(56) References Cited

U.S. PATENT DOCUMENTS 6,132,011 A * 10/2000 Iwamura ................ B60T 8/368
                                                  303/119.2
10,981,622 B2 * 4/2021 Ikeda ...................... B62L 3/023
(Continued)

FOREIGN PATENT DOCUMENTS

EP    3392105 A2    10/2018
JP    6118424 B2    4/2017
(Continued)

OTHER PUBLICATIONS

International Search Report and Written Opinion for Application No. PCT/IB2020/057749 dated Nov. 2, 2020 (9 pages).

*Primary Examiner* — Christopher P Schwartz
(74) *Attorney, Agent, or Firm* — Michael Best & Friedrich LLP

(57) ABSTRACT

A hydraulic pressure control unit capable of suppressing application of an external force thereto in comparison with the related art at the time when mounted to a straddle-type vehicle is obtained.
A hydraulic pressure control unit (1) includes: a base body (10) formed with an internal channel through which a brake fluid flows; an inlet valve and an outlet valve that open/close the internal channel during anti-lock brake control; a first coil (61) as a drive source of the inlet valve; a second coil as a drive source of the outlet valve; and a circuit board (36) that is electrically connected to the first coil (61) and a second coil and controls energization of the first coil (61) and the second coil. The base body (10) is held to a front fork (216). When the straddle-type vehicle to which the hydraulic
(Continued)

pressure control unit (1) is mounted is seen in a front view, the circuit board (36) is located behind the front fork (216) and the base body (10), and the first coil (61) and the second coil are erected from a rear surface of the base body (10).

14 Claims, 7 Drawing Sheets

(51) Int. Cl.
  *B60T 8/36* (2006.01)
  *B60T 8/42* (2006.01)
  *B60T 13/66* (2006.01)
  *B60T 13/68* (2006.01)
  *B62K 19/38* (2006.01)
(52) U.S. Cl.
  CPC .......... *B60T 13/662* (2013.01); *B60T 13/686* (2013.01); *B62K 19/38* (2013.01)
(58) Field of Classification Search
  USPC ....................................................... 188/152
  See application file for complete search history.

(56) References Cited

U.S. PATENT DOCUMENTS

| | | | | |
|---|---|---|---|---|
| 2011/0204708 A1* | 8/2011 | Kodama | ................. | B60T 8/368 |
| | | | | 303/10 |
| 2015/0245483 A1* | 8/2015 | Miyasaka | ............ | H05K 3/4015 |
| | | | | 303/20 |
| 2015/0329094 A1* | 11/2015 | Weh | ...................... | B60T 8/3675 |
| | | | | 303/167 |
| 2022/0297646 A1* | 9/2022 | Atsushi | ................. | B60T 8/1706 |
| 2022/0411010 A1* | 12/2022 | Chiba | ................... | B60T 13/686 |

FOREIGN PATENT DOCUMENTS

| | | | | |
|---|---|---|---|---|
| WO | WO-2012067168 A1 * | 5/2012 | ............ | B60T 8/3685 |
| WO | 2019159029 A1 | 8/2019 | | |
| WO | 2019159046 A1 | 8/2019 | | |
| WO | 2019159060 A1 | 8/2019 | | |

* cited by examiner

[FIG. 1]
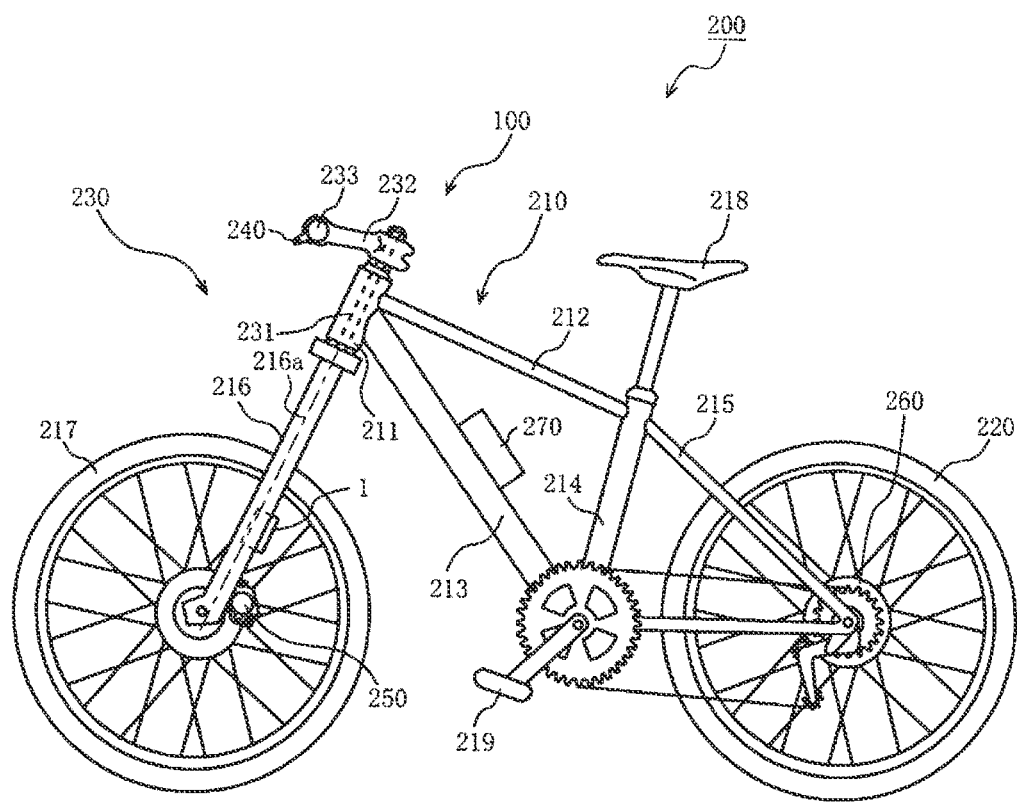

[FIG. 2]
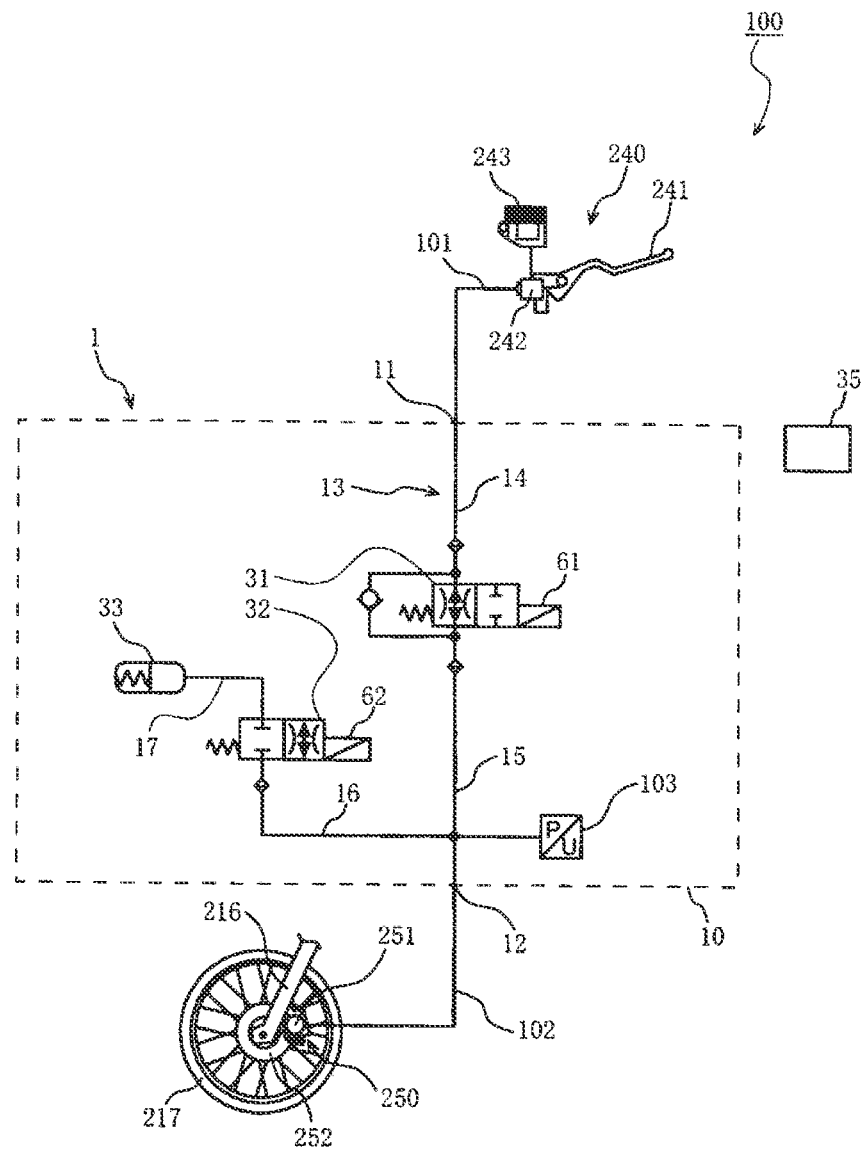

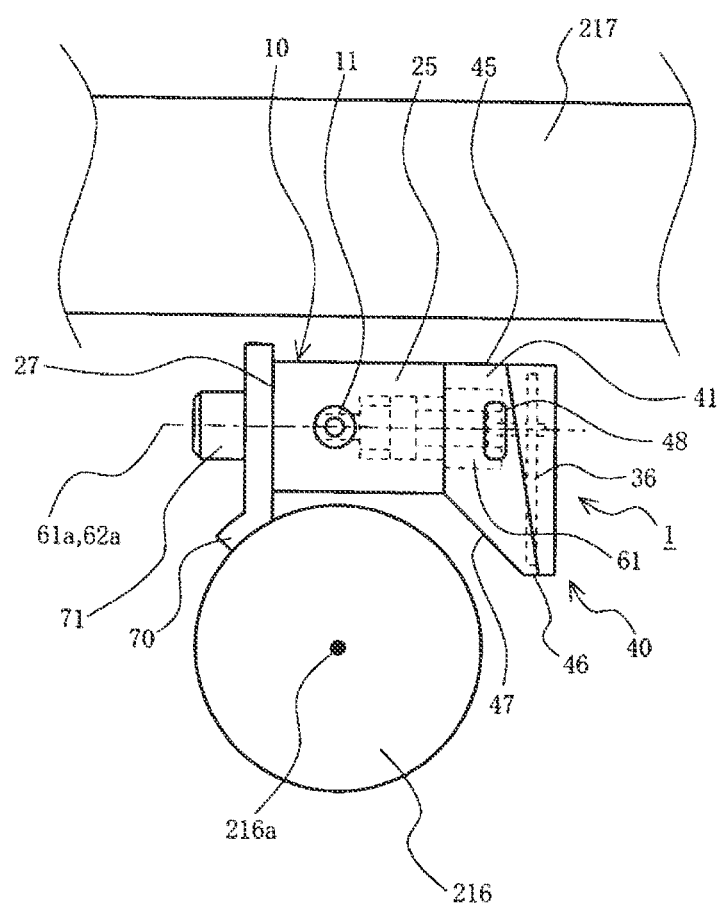
[FIG. 3]

[FIG. 4]
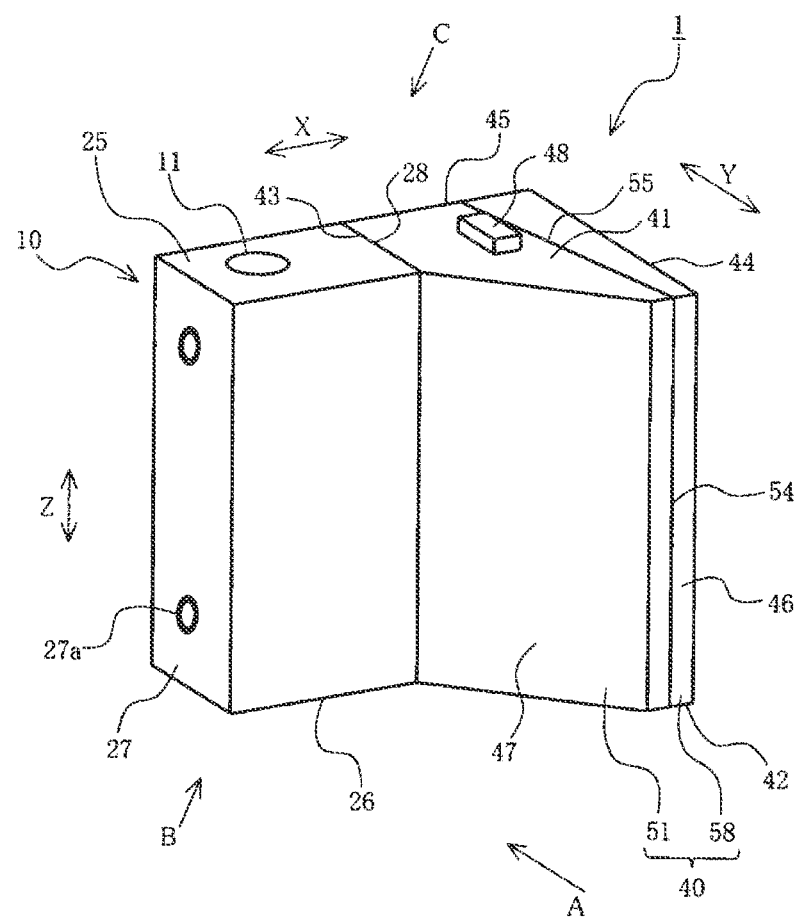

[FIG. 5]
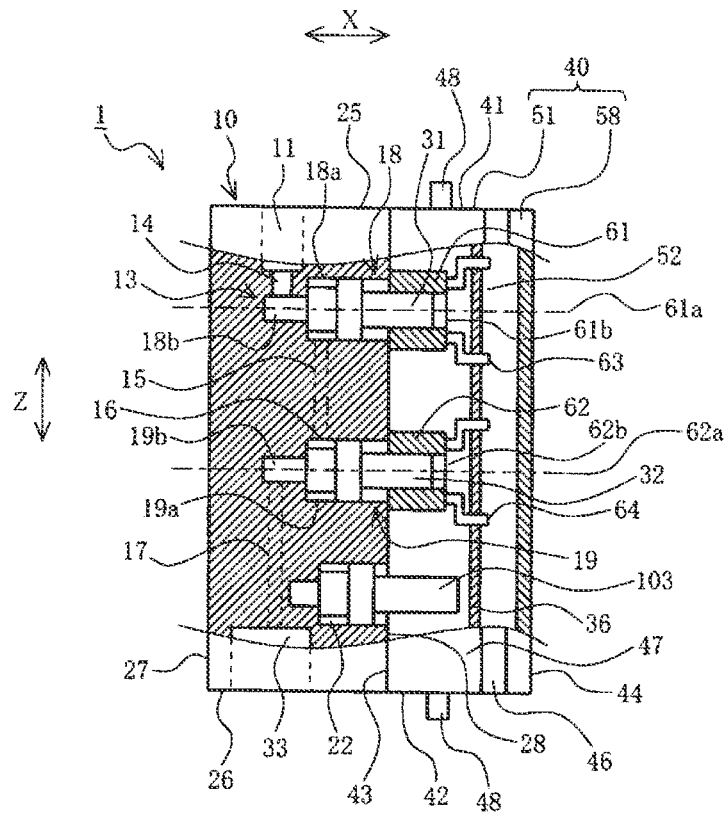
[FIG. 6]
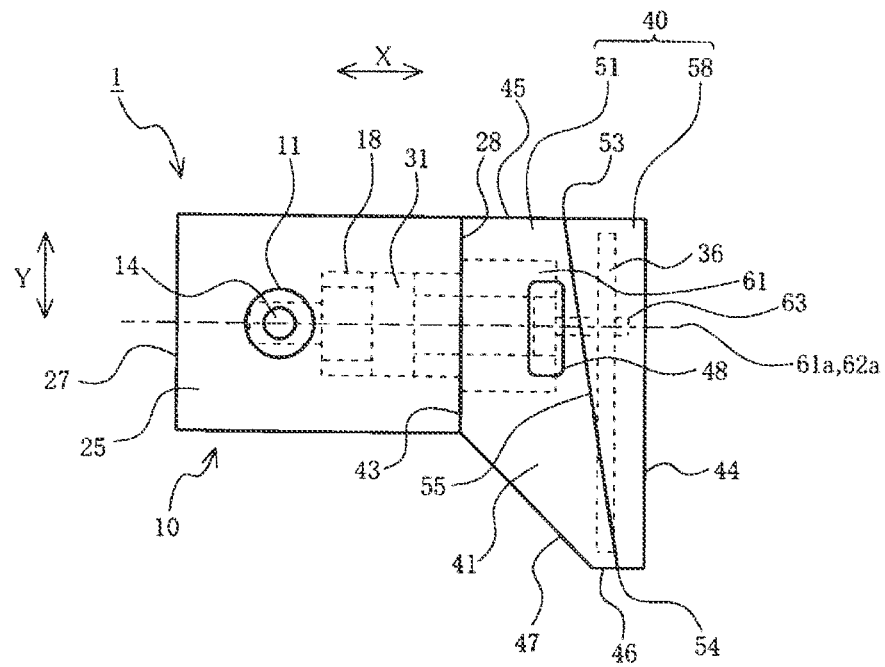

[FIG. 7]
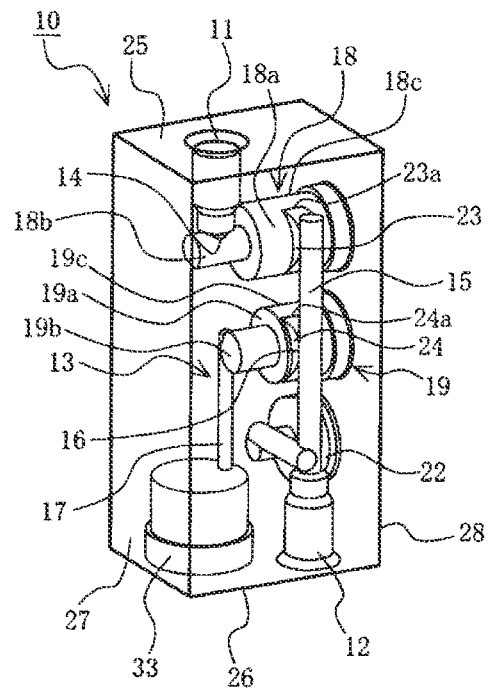
[FIG. 8]
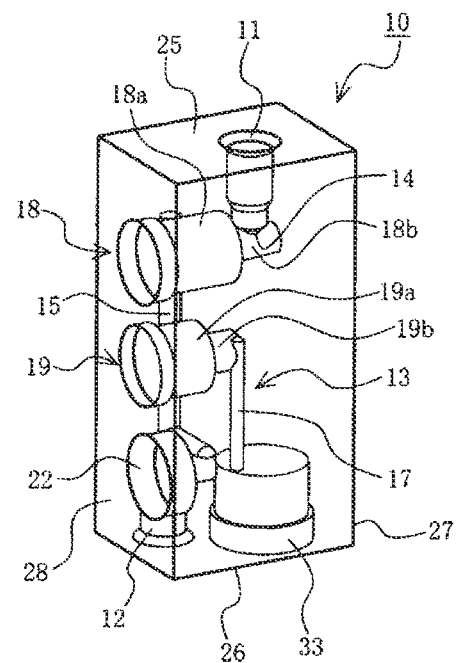

[FIG. 9]
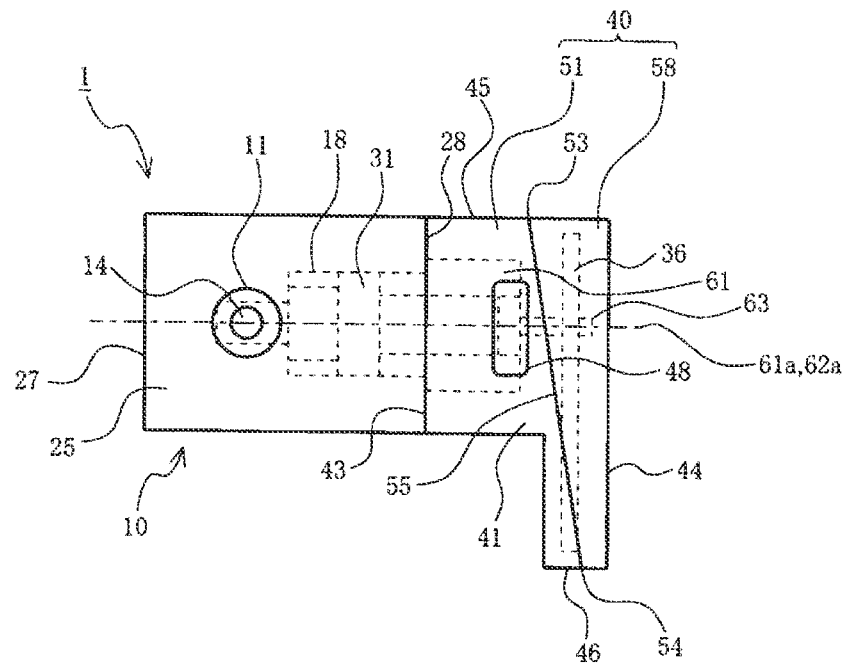
[FIG. 10]
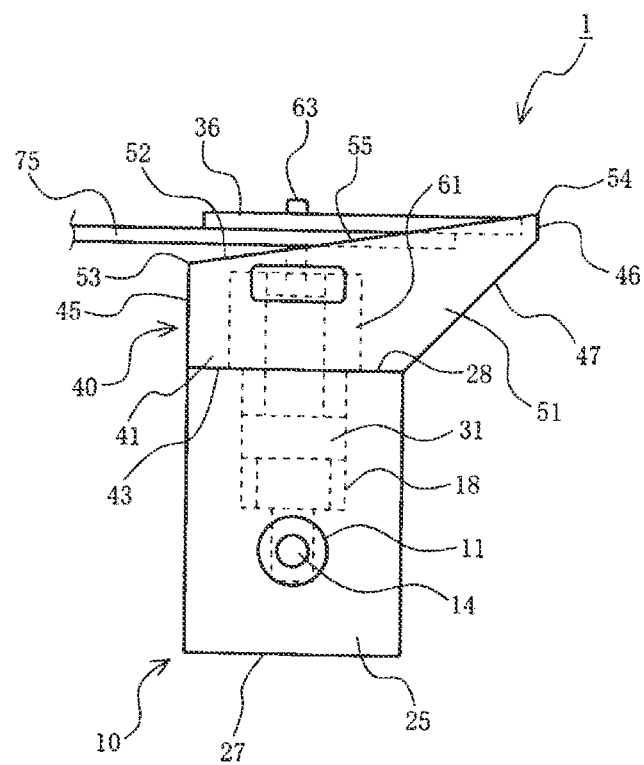

HYDRAULIC PRESSURE CONTROL UNIT, BRAKE SYSTEM, AND STRADDLE-TYPE VEHICLE

TECHNICAL FIELD

The present invention relates to a hydraulic pressure control unit for a brake system mounted to a straddle-type vehicle, a brake system including the hydraulic pressure control unit, and a straddle-type vehicle including the brake system.

BACKGROUND ART

A conventional straddle-type vehicle that includes a brake system capable of executing anti-lock brake control for controlling a braking force on a wheel by controlling a pressure of a brake fluid has been available. Such a brake system includes a hydraulic pressure control unit. The hydraulic pressure control unit includes: a base body formed with an internal channel through which the brake fluid flows; an inlet valve and an outlet valve, each of which is provided to the base body to open/close the internal channel; a first coil as a drive source of the inlet valve; a second coil as a drive source of the outlet valve; and a circuit board that is electrically connected to the first coil and the second coil so as to control energization of the first coil and the second coil.

When mounted to the straddle-type vehicle, the hydraulic pressure control unit is held by a front fork of the straddle-type vehicle (see PTL 1). At this time, when the straddle-type vehicle is seen in a front view, at least a part of the conventional hydraulic pressure control unit is arranged on an outer side of the front fork. In other words, when the straddle-type vehicle, to which the conventional hydraulic pressure control unit is mounted, is seen in the front view, at least the part of the conventional hydraulic pressure control unit is arranged in a region on an opposite side of a front wheel with the front fork that holds the hydraulic pressure control unit being a reference.

CITATION LIST

Patent Literature

PTL 1: Japanese Patent No. 6,118,424

SUMMARY OF INVENTION

Technical Problem

As described above, when the straddle-type vehicle is seen in the front view, at least the part of the conventional hydraulic pressure control unit is arranged on the outer side of the front fork. For this reason, the conventional hydraulic pressure control unit is likely to be applied with an external force, for example, when a flipped stone or the like hits the conventional hydraulic pressure control unit during travel of the straddle-type vehicle. The conventional hydraulic pressure control unit is also likely to be applied with the external force by hitting the ground or the like when the straddle-type vehicle falls. Just as described, there is a problem that the conventional hydraulic pressure control unit is in a state of being likely to be applied with the external force when mounted to the straddle-type vehicle.

The present invention has been made with the above-described problem as the background and therefore has a purpose of obtaining a hydraulic pressure control unit capable of suppressing application of an external force thereto in comparison with the related art when mounted to a straddle-type vehicle. The present invention also has a purpose of obtaining a brake system that includes such a hydraulic pressure control unit. The present invention further has a purpose of obtaining a straddle-type vehicle that includes such a brake system.

Solution to Problem

A hydraulic pressure control unit according to the present invention is a hydraulic pressure control unit for a brake system mounted to a straddle-type vehicle, in which a front wheel is held in a freely rotatable manner between a pair of front forks, and capable of executing anti-lock brake control. The hydraulic pressure control unit is configured to store a brake fluid that is released from a wheel cylinder during depressurization in the anti-lock brake control in an accumulator and to discharge the brake fluid in the accumulator to outside of the accumulator in a pumpless manner. The hydraulic pressure control unit includes: a base body formed with a master cylinder port to which a fluid pipe communicating with a master cylinder is connected, a wheel cylinder port to which a fluid pipe communicating with the wheel cylinder is connected, and an internal channel that communicates the master cylinder port and the wheel cylinder port with each other; an inlet valve and an outlet valve that are provided to the base body and open/close the internal channel during the anti-lock brake control; a first coil as a drive source of the inlet valve; a second coil as a drive source of the outlet valve; and a circuit board that is electrically connected to the first coil and the second coil and controls energization of the first coil and the second coil. The base body is held by the front fork. In a state where the straddle-type vehicle, to which the hydraulic pressure control unit is mounted, is seen in a front view, the circuit board is located behind the front fork and the base body, and the first coil and the second coil are erected from a rear surface of the base body.

A brake system according to the present invention includes the hydraulic pressure control unit according to the present invention.

A straddle-type vehicle according to the present invention includes the brake system according to the present invention.

Advantageous Effects of Invention

In the hydraulic pressure control unit, a length in an alignment direction of the inlet valve, the first coil, and the circuit board is long. In other words, in the hydraulic pressure control unit, a length in an alignment direction of the outlet valve, the second coil, and the circuit board is long. In the hydraulic pressure control unit, in a peripheral edge of the circuit board, a length in a direction in which a mounting surface of the circuit board extends is long. In the hydraulic pressure control unit according to the present invention, in the state where the straddle-type vehicle to which the hydraulic pressure control unit is mounted is seen in the front view, the alignment direction of the inlet valve, the first coil, and the circuit board is a longitudinal direction. In other words, in the hydraulic pressure control unit according to the present invention, in the state where the straddle-type vehicle to which the hydraulic pressure control unit is mounted is seen in the front view, the alignment direction of the outlet valve, the second coil, and the circuit board is the longitudinal direction. In the hydraulic pressure control unit according to the present invention, in the state where the straddle-type vehicle to which the hydraulic pressure control unit is mounted is seen in the front view, the circuit board is located behind the front fork.

Accordingly, in the hydraulic pressure control unit according to the present invention, at least a part of the base body can be formed to have a smaller lateral width than a clearance between the front fork and the front wheel, and at least the part of the base body can be arranged between the front fork and the front wheel. Therefore, when the straddle-type vehicle to which the hydraulic pressure control unit is mounted is seen in the front view, a region of the hydraulic pressure control unit according to the present invention that is arranged on an outer side of the front fork can be made smaller than the related art, and it is thus possible to suppress the hydraulic pressure control unit from being applied with the external force in comparison with the related art.

BRIEF DESCRIPTION OF DRAWINGS

FIG. 1 is a view illustrating a schematic configuration of a pedal-driven vehicle to which a brake system according to an embodiment of the present invention is mounted.

FIG. 2 is a view illustrating a schematic configuration of the brake system according to the embodiment of the present invention.

FIG. 3 is a plan view of a hydraulic pressure control unit according to the embodiment of the present invention.

FIG. 4 is a perspective view of the hydraulic pressure control unit according to the embodiment of the present invention.

FIG. 5 is a side view of the hydraulic pressure control unit according to the embodiment of the present invention, and is also a partial cross-sectional view thereof.

FIG. 6 is a plan view of the hydraulic pressure control unit according to the embodiment of the present invention.

FIG. 7 is a perspective view of a base body of the hydraulic pressure control unit according to the embodiment of the present invention, and is also a transmissive view of inside thereof.

FIG. 8 is a perspective view of the base body of the hydraulic pressure control unit according to the embodiment of the present invention, and is also a transmissive view of the inside thereof.

FIG. 9 is a plan view of another example of the hydraulic pressure control unit according to the embodiment of the present invention.

FIG. 10 is a view for explaining a method for assembling a circuit board in the hydraulic pressure control unit according to the embodiment of the present invention.

DESCRIPTION OF EMBODIMENTS

A description will hereinafter be made on a hydraulic pressure control unit, a brake system, and a straddle-type vehicle according to the present invention with reference to the drawings.

The following description will be made on a case where the present invention is adopted for a pedal-driven vehicle (for example, a two-wheeled vehicle, a three-wheeled vehicle, or the like). However, the present invention may be adopted for a straddle-type vehicle other than the pedal-driven vehicle. Examples of the straddle-type vehicle other than the pedal-driven vehicle are a two-wheeled motor vehicle, a three-wheeled motor vehicle, and an all-terrain vehicle, each of which has at least one of an engine and an electric motor as a drive source. The pedal-driven vehicle means a vehicle in general that can travel forward on a road by a depressing force applied to pedals. That is, the pedal-driven vehicles include a normal pedal-driven vehicle, an electrically-assisted pedal-driven vehicle, an electric pedal-driven vehicle, and the like. Meanwhile, the two-wheeled motor vehicle and the three-wheeled motor vehicle each mean a so-called motorcycle, and the motorcycles include a bike, a scooter, an electric scooter, and the like.

A configuration, operation, and the like, which will be described below, constitute merely one example. Each of the hydraulic pressure control unit, the brake system, and the straddle-type vehicle according to the present invention is not limited to a case with such a configuration, such operation, and the like. For example, the following description will be made on a case where the brake system according to the present invention executes anti-lock brake control only for a braking force generated on a front wheel. However, the brake system according to the present invention may execute the anti-lock brake control only for a braking force generated on a rear wheel, or may execute the anti-lock brake control for both of the braking force generated to the front wheel and the braking force generated on the rear wheel.

In the drawings, the same or similar members or portions will be denoted by the same reference sign or will not be denoted by a reference sign. In addition, a detailed structure will appropriately be illustrated in a simplified manner or will not be illustrated. An overlapping description will appropriately be simplified or will not be made.

<Mounting of Brake System to Pedal-Driven Vehicle>

A description will be made on mounting of a brake system according to an embodiment to the pedal-driven vehicle.

FIG. 1 is a view illustrating a schematic configuration of the pedal-driven vehicle to which the brake system according to the embodiment of the present invention is mounted. FIG. 1 illustrates a case where a pedal-driven vehicle 200 is the two-wheeled vehicle. However, the pedal-driven vehicle 200 may be another pedal-driven vehicle such as the three-wheeled vehicle.

The pedal-driven vehicle 200 as an example of the straddle-type vehicle includes a frame 210, a turning section 230, a saddle 218, a pedal 219, a rear wheel 220, and a rear-wheel braking section 260.

For example, the frame 210 includes: a head tube 211 pivotally supporting a steering column 231 in the turning section 230; a top tube 212 and a down tube 213, each of which is coupled to the head tube 211; a seat tube 214 that is coupled to the top tube 212 and the down tube 213 and holds the saddle 218; and a stay 215 that is coupled to upper and lower ends of the seat tube 214 and holds the rear wheel 220 and the rear-wheel braking section 260.

The turning section 230 includes: the steering column 231; a handlebar stem 232 held by the steering column 231; a handlebar 233 held by the handlebar stem 232; a brake operation section 240 attached to the handlebar 233; a front fork 216 coupled to the steering column 231; a front wheel 217 held in a freely rotatable manner by the front fork 216; and a front-wheel braking section 250. The front fork 216 is provided to each side of the front wheel 217. One end of the front fork 216 is coupled to the steering column 231, and the other end thereof is connected to a center of rotation of the front wheel 217. That is, the front wheel 217 is held in the freely rotatable manner between a pair of the front forks 216. The front fork 216 may be a front fork with a suspension.

The brake operation section 240 includes: a mechanism used as an operation section of the front-wheel braking section 250; and a mechanism used as an operation section of the rear-wheel braking section 260. For example, the mechanism used as the operation section of the front-wheel braking section 250 is disposed on a right end side of the handlebar 233, and the mechanism used as the operation section of the rear-wheel braking section 260 is disposed on a left end side of the handlebar 233.

A hydraulic pressure control unit 1 is held by the front fork 216 in the turning section 230. The hydraulic pressure control unit 1 is a unit that controls a pressure of a brake fluid in the front-wheel braking section 250. The rear-wheel braking section 260 may be a braking section of a type that generates a braking force by increasing the pressure of the brake fluid, or may be of a braking section of a type that mechanically generates the braking force (for example, the braking section of a type that generates the braking force by generating a tensile force on a wire, or the like).

For example, a power supply unit 270 that serves as a power supply for the hydraulic pressure control unit 1 is attached to the down tube 213 of the frame 210. The power supply unit 270 may be a battery or a generator. Examples of the generator are: a generator that generates electrical power by travel of the pedal-driven vehicle 200 (for example, a hub dynamo that generates the electrical power by rotation of the front wheel 217 or the rear wheel 220, a generator that also serves as a motor for a drive source of the front wheel 217 or the rear wheel 220 and generates regenerative power, or the like); and a generator that generates the electric power by sunlight.

That is, a brake system 100 is mounted to the pedal-driven vehicle 200, and the brake system 100 at least includes the brake operation section 240, the front-wheel braking section 250, the hydraulic pressure control unit 1, and the power supply unit 270. The brake system 100 can execute anti-lock brake control by controlling the pressure of the brake fluid in the front-wheel braking section 250 with the hydraulic pressure control unit 1.

<Configuration of Brake System>

A description will be made on a configuration of the brake system according to the embodiment.

FIG. 2 is a view illustrating a schematic configuration of the brake system according to the embodiment of the present invention.

The hydraulic pressure control unit 1 includes a base body 10. The base body 10 is formed with a master cylinder port 11, a wheel cylinder port 12, and an internal channel 13 that communicates the master cylinder port 11 and the wheel cylinder port 12 with each other.

The internal channel 13 is a channel for the brake fluid. The internal channel 13 includes a first channel 14, a second channel 15, a third channel 16, and a fourth channel 17. The master cylinder port 11 and the wheel cylinder port 12 communicate with each other via the first channel 14 and the second channel 15. In addition, an end portion on an inlet side of the third channel 16 is connected to an intermediate portion of the second channel 15.

The brake operation section 240 is connected to the master cylinder port 11 via a fluid pipe 101. The brake operation section 240 includes a brake lever 241, a master cylinder 242, and a reservoir 243. The master cylinder 242 includes a piston section (not illustrated) that moves in an interlocking manner with an operation of the brake lever 241 by a user, and is connected to an inlet side of the first channel 14 via the fluid pipe 101 and the master cylinder port 11. In other words, the fluid pipe 101 that communicates with the master cylinder 242 is connected to the master cylinder port 11. With movement of the piston section, the pressure of the brake fluid in the first channel 14 is increased or reduced. The reservoir 243 stores the brake fluid for the master cylinder 242.

The front-wheel braking section 250 is connected to the wheel cylinder port 12 via a fluid pipe 102. The front-wheel braking section 250 includes a wheel cylinder 251 and a rotor 252. The wheel cylinder 251 is attached to a lower end portion of the front fork 216. The wheel cylinder 251 includes a piston section (not illustrated) that moves in an interlocking manner with a pressure in the fluid pipe 102, and is connected to an outlet side of the second channel 15 via the fluid pipe 102 and the wheel cylinder port 12. In other words, the fluid pipe 102 that communicates with the wheel cylinder 251 is connected to the wheel cylinder port 12. The rotor 252 is held by the front wheel 217 and rotates with the front wheel 217. When a brake pad (not illustrated) is pressed against the rotor 252 due to movement of the piston section, the front wheel 217 brakes.

The hydraulic pressure control unit 1 also includes an inlet valve 31 and an outlet valve 32, each of which opens/closes the internal channel 13. The inlet valve 31 and the outlet valve 32 are provided to the base body 10. More specifically, the inlet valve 31 is provided between an outlet side of the first channel 14 and an inlet side of the second channel 15 and allows/blocks a flow of the brake fluid between the first channel 14 and the second channel 15. The outlet valve 32 is provided between an outlet side of the third channel 16 and an inlet side of a fourth channel 17 and allows/blocks a flow of the brake fluid between the third channel 16 and the fourth channel 17. The pressure of the brake fluid is controlled by opening/closing operation of the inlet valve 31 and the outlet valve 32. The brake system 100 according to this embodiment is a brake system of a single system that executes the anti-lock brake control only for the braking force generated on the front wheel. Thus, in this embodiment, only a pair of the inlet valve 31 and the outlet valve 32 is provided to the base body 10.

The hydraulic pressure control unit 1 includes: a first coil 61 as a drive source of the inlet valve 31; and a second coil 62 as a drive source of the outlet valve 32. For example, when the first coil 61 is in an unenergized state, the inlet valve 31 allows a bidirectional flow of the brake fluid. Then, when the first coil 61 is energized, the inlet valve 31 is brought into a closed state and blocks the flow of the brake fluid. That is, in this embodiment, the inlet valve 31 is an electromagnetic valve that is opened when not energized. In addition, for example, when the second coil 62 is in an unenergized state, the outlet valve 32 blocks the flow of the brake fluid. Then, when the second coil 62 is energized, the outlet valve 32 is brought into an open state and allows the bidirectional flow of the brake fluid. That is, in this embodiment, the outlet valve 32 is an electromagnetic valve that is closed when not energized.

The hydraulic pressure control unit 1 includes an accumulator 33. The accumulator 33 is connected to an outlet side of the fourth channel 17 and stores the brake fluid that has flowed through the outlet valve 32.

The hydraulic pressure control unit 1 includes a pressure sensor 103 that detects the pressure of the brake fluid. The pressure sensor 103 is provided to the base body 10. In this embodiment, the pressure sensor 103 detects the pressure of the brake fluid in the wheel cylinder 251. The pressure sensor 103 communicates with the second channel 15.

The hydraulic pressure control unit 1 includes a control section 35. The control section 35 receives signals from various sensors such as the pressure sensor 103 and a wheel rotational frequency sensor (not illustrated) that detects a rotational frequency of the front wheel 217. Portions of the control section 35 may be disposed collectively or may be disposed separately. The control section 35 may be configured by including a microcomputer, a microprocessor unit, or the like, may be configured by including a member in which firmware and the like can be updated, or may be configured by including a program module or the like that is executed by a command from a CPU or the like, for example.

The control section 35 controls the energization of the first coil 61 and the second coil 62. In detail, the control section 35 controls the energization of the first coil 61 and thereby controls driving (the opening/closing operation) of the inlet valve 31. In addition, the control section 35 controls the energization of the second coil 62 and thereby controls driving (the opening/closing operation) of the outlet valve 32. That is, by controlling the opening/closing operation of the inlet valve 31 and the outlet valve 32, the control section 35 controls the pressure of the brake fluid in the wheel cylinder 251, that is, the braking force on the front wheel 217.

In this embodiment, the control section 35 includes a circuit board 36 as will be described below. The circuit board 36 is electrically connected to the first coil 61 and the second coil 62 and controls the energization of the first coil 61 and the second coil 62. That is, by controlling the energization of the first coil 61 and the second coil 62, the circuit board 36 controls driving of the inlet valve 31 and the outlet valve 32.

For example, in the case where the control section 35 determines that the front wheel 217 is locked or possibly locked on the basis of the signal from the wheel rotational frequency sensor (not illustrated) at the time when the front wheel 217 brakes due to the operation of the brake lever 241 by the user, the control section 35 initiates the anti-lock brake control.

Once initiating the anti-lock brake control, the control section 35 brings the first coil 61 into an energized state, closes the inlet valve 31, and blocks the flow of the brake fluid from the master cylinder 242 to the wheel cylinder 251, so as to prevent an increase in the pressure of the brake fluid in the wheel cylinder 251. Meanwhile, the control section 35 brings the second coil 62 into an energized state, opens the outlet valve 32, and allows the flow of the brake fluid from the wheel cylinder 251 to the accumulator 33, so as to reduce the pressure of the brake fluid in the wheel cylinder 251. In this way, the front wheel 217 is unlocked, or locking thereof is avoided. In the case where the control section 35 determines, on the basis of the signal from the pressure sensor 103, that the pressure of the brake fluid in the wheel cylinder 251 is reduced to a specified value, the control section 35 brings the second coil 62 into the unenergized state to close the outlet valve 32, and brings the first coil 61 into the unenergized state to open the inlet valve 31 for a short period of time, so as to increase the pressure of the brake fluid in the wheel cylinder 251. The control section 35 may increase/reduce the pressure of the brake fluid in the wheel cylinder 251 once or may repeatedly increase/reduce the pressure of the brake fluid in the wheel cylinder 251 for a plurality of times.

When the anti-lock brake control is terminated and the brake lever 241 returns, the inside of the master cylinder 242 is brought into an atmospheric pressure state, and the brake fluid in the wheel cylinder 251 returns. In addition, when the anti-lock brake control is terminated and the brake lever 241 returns, the outlet valve 32 is brought into the open state. When the pressure of the brake fluid in the internal channel 13 becomes lower than the pressure of the brake fluid stored in the accumulator 33, the brake fluid stored in the accumulator 33 is discharged to the outside of the accumulator 33 without increasing the pressure thereof (that is, in a pumpless manner). Then, the brake fluid that has been discharged to the outside of the accumulator 33 sequentially flows through the fourth channel 17, the outlet valve 32, the third channel 16, the second channel 15, the inlet valve 31, and the first channel 14, then flows through the master cylinder port 11 and the fluid pipe 101, and returns to the master cylinder 242. That is, the hydraulic pressure control unit 1 according to this embodiment is configured to store the brake fluid that is released from the wheel cylinder 251 during depressurization in the anti-lock brake control in the accumulator 33 and to discharge the brake fluid in the accumulator 33 to the outside of the accumulator 33 in the pumpless manner. In addition, the internal channel 13 is configured not to be able to return the brake fluid in the accumulator 33 to the master cylinder port 11 without interposing the outlet valve 32.

<Configuration of Hydraulic Pressure Control Unit>

A description will be made on a configuration of the hydraulic pressure control unit for the brake system according to the embodiment.

A description will hereinafter be made on a configuration of the hydraulic pressure control unit 1 while the hydraulic pressure control unit 1 is observed such that an extending direction of an axis 216a of the front fork 216 corresponds to a vertical direction of the hydraulic pressure control unit 1 in a state where the hydraulic pressure control unit 1 is held by the front fork 216 of the pedal-driven vehicle 200.

FIG. 3 is a plan view of the hydraulic pressure control unit according to the embodiment of the present invention. This FIG. 3 illustrates, together with the hydraulic pressure control unit 1, the front wheel 217 and the front fork 216 that holds the hydraulic pressure control unit 1. In FIG. 3, a left side of the sheet corresponds to a front side of the pedal-driven vehicle 200. That is, a state where the pedal-driven vehicle 200, to which the hydraulic pressure control unit 1 is mounted, is seen in a front view is a state where the hydraulic pressure control unit 1, the front fork 216, and the front wheel 217 are observed from the left side of the sheet of FIG. 3.

FIG. 4 is a perspective view of the hydraulic pressure control unit according to the embodiment of the present invention. FIG. 5 is a side view of the hydraulic pressure control unit according to the embodiment of the present invention, and is also a partial cross-sectional view thereof. Here, FIG. 5 is a partial cross-sectional side view in which the hydraulic pressure control unit 1 is observed in an arrow A direction illustrated in FIG. 4. In addition, in FIG. 5, the second channel 15 of the internal channel 13 is located in front of a cross-sectional portion. Accordingly, FIG. 5 illustrates a part of the second channel 15 by two-dot chain lines as imaginary lines. FIG. 6 is a plan view of the hydraulic pressure control unit according to the embodiment of the present invention. Each of FIG. 7 and FIG. 8 is a perspective view of the base body of the hydraulic pressure control unit according to the embodiment of the present invention, and is also a transmissive view of the inside thereof. In detail, FIG. 7 is a view in which the base body 10 is observed in an arrow B direction illustrated in FIG. 4. FIG. 8 is a view in which the base body 10 is observed in an arrow C direction illustrated in FIG. 4. In order to facilitate view of the internal channel 13 in the base body 10, a female screw 27a that is formed in a front surface 27 of the base body 10 is not illustrated in FIG. 7 and FIG. 8.

A description will herein be made on the configuration of the hydraulic pressure control unit 1 according to this embodiment with reference to FIG. 3 to FIG. 8. In the description on the configuration of the hydraulic pressure control unit 1, a connection direction X, a width direction Y, and an axial direction Z illustrated in FIG. 4 are defined as follows. The connection direction X is a connection direction of a housing, which will be described later, to the base body. The width direction Y is a perpendicular direction to the connection direction X. The width direction Y is also a direction in which the front fork 216 and the front wheel 217 oppose each other, and indicates a lateral width of the hydraulic pressure control unit 1. The axial direction Z is a parallel direction with the axis 216a of the front fork 216. The axial direction Z is also a perpendicular direction to the width direction Y. In detail, the axial direction Z is a direction that is perpendicular to the connection direction X and is perpendicular to the width direction Y. An upper surface 25 and a lower surface 26, each of which will be described later, in the base body 10 are aligned in the axial direction Z. Thus, it can also be said that the axial direction Z is a direction in which the upper surface 25 and the lower surface 26 are aligned.

The hydraulic pressure control unit 1 includes the base body 10, the inlet valve 31, the outlet valve 32, the first coil 61, the second coil 62, the circuit board 36, and a housing 40.

The base body 10 is a substantially rectangular-parallelepiped member, and an aluminum alloy is used as a material therefor, for example. Each of the surfaces of the base body 10 may be flat, may include a curved portion, or may include a step. As described above, the base body 10 is formed with the master cylinder port 11, the wheel cylinder port 12, and the internal channel 13 that communicates the master cylinder port 11 and the wheel cylinder port 12 with each other. The base body 10 is also formed with: an inlet valve recess 18 to which the inlet valve 31 is provided; and an outlet valve recess 19 to which the outlet valve 32 is provided.

As illustrated in FIG. 7 and FIG. 8, the master cylinder port 11 is formed in the upper surface 25 of the base body 10. The inlet valve recess 18 is formed to be opened to a rear surface 28 of the base body 10. The inlet valve recess 18 includes a first recess 18a and a second recess 18b. The first recess 18a is a recess that is opened to the rear surface 28 of the base body 10 and has a substantially cylindrical shape. The second recess 18b is arranged on the front surface 27 side of the base body 10 from the first recess 18a. The second recess 18b has a substantially cylindrical shape with a smaller diameter than the first recess 18a, and communicates with a bottom portion of the first recess 18a. The master cylinder port 11 and the second recess 18b of the inlet valve recess 18 are connected to each other by the first channel 14 of the internal channel 13.

The second channel 15 of the internal channel 13 is connected to the first recess 18a of the inlet valve recess 18. Although the first recess 18a and the second channel 15 may directly be connected to each other, in this embodiment, the first recess 18a and the second channel 15 are connected to each other via an inlet valve notch 23. The inlet valve notch 23 is formed in an inner circumferential surface of the first recess 18a in a manner to be recessed outward. An upper end portion 23a of the inlet valve notch 23 is located lower than an upper end portion 18c of the inner circumferential surface of the first recess 18a.

The outlet valve recess 19 is formed to be opened to the rear surface 28 of the base body 10. The outlet valve recess 19 and the inlet valve recess 18 are aligned in the axial direction Z. The outlet valve recess 19 includes a first recess 19a and a second recess 19b. The first recess 19a is a recess that is opened to the rear surface 28 of the base body 10 and has a substantially cylindrical shape. The second recess 19b is arranged on the front surface 27 side of the base body 10 from the first recess 19a. The second recess 19b has a substantially cylindrical shape with a smaller diameter than the first recess 19a, and communicates with a bottom portion of the first recess 19a.

The first recess 19a of the outlet valve recess 19 and the first recess 18a of the inlet valve recess 18 are connected to each other by the second channel 15 of the internal channel 13. That is, a connected portion between the first recess 19a of the outlet valve recess 19 and the second channel 15 of the internal channel 13 functions as the third channel 16 illustrated in FIG. 2. In the second channel 15, a portion that connects the inlet valve recess 18 and the outlet valve recess 19 serves as a channel that extends linearly. In addition, the second channel 15 is connected to the wheel cylinder port 12 formed in the lower surface 26 (a surface opposing the upper surface 25) of the base body 10. That is, the master cylinder port 11 and the wheel cylinder port 12 are separately formed in the upper surface 25 and the lower surface 26, respectively. In other words, the master cylinder port 11 and the wheel cylinder port 12 are separately formed in a pair of side surfaces that oppose each other in the axial direction Z. In the second channel 15, a portion that connects the inlet valve recess 18, the outlet valve recess 19, and the wheel cylinder port 12 also serves as a channel that extends linearly. Although the first recess 19a of the outlet valve recess 19 and the second channel 15 may directly be connected to each other, in this embodiment, the first recess 19a and the second channel 15 are connected to each other via an outlet valve notch 24. The outlet valve notch 24 is formed in an inner circumferential surface of the first recess 19a in a manner to be recessed outward. An upper end portion 24a of the outlet valve notch 24 is located lower than an upper end portion 19c of the inner circumferential surface of the first recess 19a.

The base body 10 according to this embodiment is formed with a pressure sensor recess 22 to which the pressure sensor 103 is provided. The pressure sensor recess 22 is formed to be opened to the rear surface 28 of the base body 10. The inlet valve recess 18, the outlet valve recess 19, and the pressure sensor recess 22 are aligned in the axial direction Z. The pressure sensor recess 22 communicates with a portion of the second channel 15 in the internal channel 13, the portion connecting the outlet valve recess 19 and the wheel cylinder port 12. That is, the pressure sensor 103 communicates with the portion, which connects the outlet valve recess 19 and the wheel cylinder port 12, in the second channel 15 of the internal channel 13.

The accumulator 33 is formed in the lower surface 26 of the base body 10. The accumulator 33 is connected to the second recess 19b of the outlet valve recess 19 by the fourth channel 17 of the internal channel 13.

As illustrated in FIG. 5, the first recess 18a of the inlet valve recess 18 is provided with the inlet valve 31 that is freely slidable in the connection direction X as an axial direction of the first recess 18a. The inlet valve 31 is partially projected rearward from the rear surface 28 of the base body 10. In addition, the first coil 61 is erected from the rear surface 28 of the base body 10. The first coil 61 is provided in a manner to surround a portion of the inlet valve 31 that is projected rearward from the rear surface 28 of the base body 10. That is, similar to the axes of the first recess 18a and the inlet valve 31, an axis 61a of the first coil 61 extends in the connection direction X. A terminal 63 is provided to a top surface 61b of the first coil 61. The first coil 61 is electrically connected to the circuit board 36, which is arranged behind the first coil 61, via this terminal 63. In this embodiment, the terminal 63 that is formed by bending is used. The terminal 63 is formed just as described. In this way, even in the case where a position of the terminal 63 and a position of an insertion hole for the terminal 63 in the circuit board 36 are misaligned from each other, deformation of the terminal 63 can cancel the misalignment therebetween. As a result, it is easy to electrically connect the terminal 63 to the circuit board 36.

By controlling the energization of the first coil 61 from the circuit board 36, the inlet valve 31 slides in the connection direction X within the first recess 18a of the inlet valve recess 18. In this way, the inlet valve 31 opens/closes a channel between the first recess 18a and the second recess 18b of the inlet valve recess 18. As a result, when the channel between the first recess 18a and the second recess 18b is opened, as illustrated in FIG. 7, the brake fluid can flow from the master cylinder 242 to the wheel cylinder 251 via the first channel 14 and the second channel 15. Meanwhile, when the channel between the first recess 18a and the second recess 18b is closed, as illustrated in FIG. 7, the flow of the brake fluid from the master cylinder 242 to the wheel cylinder 251 is blocked.

As illustrated in FIG. 5, the first recess 19a of the outlet valve recess 19 is provided with the outlet valve 32 that is freely slidable in the connection direction X as an axial direction of the first recess 19a. The outlet valve 32 is partially projected rearward from the rear surface 28 of the base body 10. In addition, the second coil 62 is erected from the rear surface 28 of the base body 10. The second coil 62 is provided in a manner to surround a portion of the outlet valve 32 that is projected rearward from the rear surface 28 of the base body 10. That is, similar to the axes of the first recess 19a and the outlet valve 32, an axis 62a of the second coil 62 extends in the connection direction X. A terminal 64 is provided to a top surface 62b of the second coil 62. The second coil 62 is electrically connected to the circuit board 36, which is arranged behind the second coil 62, via this terminal 64. In this embodiment, the terminal 64 that is formed by bending is used. The terminal 64 is formed just as described. In this way, even in the case where a position of the terminal 64 and a position of an insertion hole for the terminal 64 in the circuit board 36 are misaligned from each other, deformation of the terminal 64 can cancel the misalignment therebetween. As a result, it is easy to electrically connect the terminal 64 to the circuit board 36.

By controlling the energization of the second coil 62 from the circuit board 36, the outlet valve 32 slides in the connection direction X within the first recess 19a of the outlet valve recess 19. In this way, the outlet valve 32 opens/closes a channel between the first recess 19a and the second recess 19b of the outlet valve recess 19. As a result, when the channel between the first recess 19a and the second recess 19b is opened, as illustrated in FIG. 7, the brake fluid can flow from the wheel cylinder 251 to the accumulator 33 via the second channel 15 and the fourth channel 17.

Here, as described above, the inlet valve recess 18 and the outlet valve recess 19 are aligned in the axial direction Z. Accordingly, the first coil 61, which is provided in the manner to surround the portion of the inlet valve 31 provided to the inlet valve recess 18, and the second coil 62, which is provided in the manner to surround the portion of the outlet valve 32 provided to the outlet valve recess 19, are aligned in the axial direction Z. In addition, as described above, the inlet valve recess 18, the outlet valve recess 19, and the pressure sensor recess 22 are aligned in the axial direction Z. Accordingly, the first coil 61, the second coil 62, and the pressure sensor 103, which is provided to the pressure sensor recess 22, are aligned in the axial direction Z.

As illustrated in FIG. 5, the housing 40 accommodates the inlet valve 31, the outlet valve 32, the first coil 61, the second coil 62, and the circuit board 36. For example, the housing 40 has a substantially rectangular-parallelepiped box shape. Each surface of the housing 40 may be flat, may include a curved portion, or may include a step. In this embodiment, the housing 40 is formed of a resin. A front surface 43 of the housing 40 is connected to the rear surface 28 of the base body 10. That is, the first coil 61 and the second coil 62 described above are erected from the surface, to which the housing 40 is connected, in the base body 10.

As illustrated in FIG. 4, FIG. 6, and the like, a dimension in the width direction Y of the housing 40 is greater than a dimension in the width direction Y of the base body 10. Here, the housing 40 includes a pair of side surfaces that oppose each other in the width direction Y. Hereinafter, one of these side surfaces will be described as a first side surface 45, and the other of these side surfaces will be described as a second side surface 46. In the case where the first side surface 45 and the second side surface 46 are defined just as described, in a state where the hydraulic pressure control unit 1 is seen in the connection direction X, a center in the width direction Y of the base body 10 is located on the first side surface 45 side from a center in the width direction Y of the housing 40.

When the hydraulic pressure control unit 1 is configured as described above, a projection amount in the width direction Y of the housing 40 with respect to the base body 10 is smaller on the first side surface 45 side than on the second side surface 46 side. Accordingly, as it is understood from FIG. 3, the first side surface 45 of the housing 40 opposes the front wheel 217, and the hydraulic pressure control unit 1 is held by the front fork 216. In this way, at least a part of the base body 10 can easily be arranged between the front fork 216 and the front wheel 217.

In this embodiment, the second side surface 46 includes an inclined section 47, a dimension in the width direction Y of which is reduced toward the base body 10. However, a shape of the second side surface 46 is not limited to such a shape.

FIG. 9 is a plan view of another example of the hydraulic pressure control unit according to the embodiment of the present invention.

As illustrated in FIG. 9, the second side surface 46 may be formed in a step shape, for example. Even when the second side surface 46 is formed just as described, the first side surface 45 of the housing 40 opposes the front wheel 217, and the hydraulic pressure control unit 1 is held by the front fork 216. In this way, at least the part of the base body 10 can easily be arranged between the front fork 216 and the front wheel 217. However, since the second side surface 46 includes the inclined section 47, a clearance between the second side surface 46 and the front fork 216 can be reduced. Thus, it is possible to increase accommodation capacity of the housing 40.

As illustrated in FIG. 4 to FIG. 6, the housing 40 according to this embodiment includes a body 51 and a lid 58. A front surface of the body 51 is connected to the rear surface 28 of the base body 10. In addition, in the body 51, an opening 52 is formed in a surface that opposes the surface connected to the base body 10, that is, a rear surface of the body 51. The lid 58 is a member that covers the opening 52 of the body 51. That is, the lid 58 constitutes a rear surface 44 of the housing 40.

In the body 51 according to this embodiment, a side 53 on the first side surface 45 side that is apart of a peripheral edge of the opening 52 and a side 54 that is another part of the opening 52 and opposes the side 53 in the peripheral edge of the opening 52 establish a positional relationship illustrated in FIG. 6 in the connection direction X. More specifically, in the connection direction X, the side 53 is located on a side near the base body 10 from the circuit board 36. Meanwhile, the side 54 is located on a side farther from the base body 10 than the side 53. The side 53 and the side 54 are arranged at such positions for the following reason.

FIG. 10 is a view for explaining a method for assembling the circuit board in the hydraulic pressure control unit according to the embodiment of the present invention.

An assembly body in which the inlet valve 31, the outlet valve 32, the first coil 61, the second coil 62, and the body 51 of the housing 40 are connected to the base body 10 is prepared, and the circuit board 36 is assembled to the assembly body in a state where the assembly body is held in such a posture that the front surface 27 of the base body 10 becomes the lower surface. At this time, when the circuit board 36 is assembled to the assembly body, a jig 75 may be arranged below the circuit board 36. For example, in the case of this embodiment, as described above, the terminal 63 and the terminal 64, each of which is formed by bending, are used. In such a case, when the terminal 63 and the terminal 64 are inserted in the insertion holes of the circuit board 36, the jig 75 that supports the terminal 63 and the terminal 64 is arranged below the circuit board 36 so as to prevent an excessive load from being applied to the terminal 63 and the terminal 64.

In order to arrange the jig 75 below the circuit board 36, a portion, which opposes the jig 75, in the peripheral edge of the opening 52 of the body 51 has to be arranged at a position below the jig 75 in FIG. 10. At this time, in the case where the entire peripheral edge of the opening 52 of the body 51 is arranged at an equal distance from the base body 10 in the connection direction X, an inclination angle of the inclined section 47 to the connection direction X is increased. In other words, in FIG. 3, the inclined section 47 comes closer to the front fork 216. In addition, in the case where the second side surface 46 of the housing 40 is configured as illustrated in FIG. 9, the portion of the housing 40 that is projected to the second side surface 46 side from the base body 10 comes closer to the base body 10 than the portion at the position illustrated in FIG. 10. As illustrated in FIG. 3, when the pedal-driven vehicle 200, to which the hydraulic pressure control unit 1 is mounted, is seen in the front view, the portion of the housing 40 that is projected to the second side surface 46 side from the base body 10 is arranged behind the front fork 216. Accordingly, in the case where the entire peripheral edge of the opening 52 of the body 51 is arranged at the equal distance from the base body 10 in the connection direction X, in order to arrange the portion of the housing 40, which is projected to the second side surface 46 side from the base body 10, behind the front fork 216, it is necessary to increase a length in the connection direction X of the hydraulic pressure control unit 1 to be longer than that in states illustrated in FIG. 4 and FIG. 9. That is, in the case where the entire peripheral edge of the opening 52 of the body 51 is arranged at the equal distance from the base body 10 in the connection direction X, the hydraulic pressure control unit 1 is enlarged in comparison with the hydraulic pressure control unit 1 in each of the states illustrated in FIG. 4 and FIG. 9.

Meanwhile, when the side 53 and the side 54 are arranged as in this embodiment, the jig 75 can be arranged below the circuit board 36. In addition, compared to the case where the entire peripheral edge of the opening 52 of the body 51 is arranged at the equal distance from the base body 10 in the connection direction X, it is possible to suppress an increase in the inclination angle of the inclined section 47 to the connection direction X. In the case where the second side surface 46 of the housing 40 is configured as illustrated in FIG. 9, the jig 75 can be arranged below the circuit board 36 by arranging the side 53 and the side 54 as in this embodiment. In addition, compared to the case where the entire peripheral edge of the opening 52 of the body 51 is arranged at the equal distance from the base body 10 in the connection direction X, it is possible to suppress the portion of the housing 40 that is projected to the second side surface 46 side from the base body 10 from approaching the base body 10. That is, when the side 53 and the side 54 are arranged as in this embodiment, the jig 75 can be arranged below the circuit board 36. In addition, compared to the case where the entire peripheral edge of the opening 52 of the body 51 is arranged at the equal distance from the base body 10 in the connection direction X, it is possible to downsize the hydraulic pressure control unit 1.

In this embodiment, in the peripheral edge of the opening 52 of the body 51, a side 55 that connects the side 53 and the side 54 has a linear shape. That is, the side 53 is continuously connected to the side 54. However, the side 55 is not limited to have the linear shape and may have a step shape, for example. Here, by continuously connecting the side 53 to the side 54, it is possible to prevent a clearance from being formed between the peripheral edge of the opening 52 of the body 51 and the lid 58. Accordingly, by continuously connecting the side 53 to the side 54, it is possible to improve airtightness between the peripheral edge of the opening 52 of the body 51 and the lid 58.

The hydraulic pressure control unit 1 includes a connector 48 in the housing 40, and the connector 48 is electrically connected to the circuit board 36. The connector 48 is connected to cables that include signal wires (not illustrated) for the various sensors such as the pressure sensor 103 and the wheel rotational frequency sensor (not illustrated) for detecting the rotational frequency of the front wheel 217, a power wire (not illustrated) extending from the power supply unit 270, and the like. Here, as illustrated in FIG. 3 to FIG. 6, in this embodiment, the connector 48 is provided to at least one of an upper surface 41 and a lower surface 42 of the housing 40. In other words, the connector 48 is arranged to at least one of the paired side surfaces that oppose each other in the axial direction Z in the housing 40. In this embodiment, an example in which the connector 48 is provided to each of the upper surface 41 and the lower surface 42 of the housing 40 is described.

In this embodiment, as illustrated in FIG. 3, the hydraulic pressure control unit 1 is held by the front fork 216 and is mounted to the pedal-driven vehicle 200. More specifically, as illustrated in FIG. 4, the front surface 27 of the base body 10 is formed with the female screw 27a. Meanwhile, as illustrated in FIG. 3, the front fork 216 includes a bracket 70 that is projected toward the front wheel 217. When a bolt 71 that is inserted in an unillustrated through hole of the bracket 70 is screwed to the female screw 27a of the hydraulic pressure control unit 1, the hydraulic pressure control unit 1 is held by the front fork 216. The configuration of holding the hydraulic pressure control unit 1 by the front fork 216 is not limited to the configuration illustrated in FIG. 3. For example, the hydraulic pressure control unit 1 may be held by the front fork 216 using a holding member, such as a fixing belt, that is a different component from the front fork 216.

Here, as it is understood from FIG. 3 to FIG. 6, in the state where the pedal-driven vehicle 200 to which the hydraulic pressure control unit 1 is mounted is seen in the front view, the circuit board 36 is located behind the front fork 216 and the base body 10. In addition, the first coil 61 and the second coil 62 are erected from the rear surface 28 of the base body 10. In other words, in a state where the pedal-driven vehicle 200 to which the hydraulic pressure control unit 1 is mounted is observed in a direction of the axis 216a of the front fork 216, the circuit board 36 is located behind the front fork 216 and the base body 10. In addition, the first coil 61 and the second coil 62 are erected from the rear surface 28 of the base body 10.

As illustrated in FIG. 3, in the state where the hydraulic pressure control unit 1 is mounted to the pedal-driven vehicle 200, at least the part of the base body 10 is located between the front fork 216 and the front wheel 217. In this embodiment, the entire base body 10 is located between the front fork 216 and the front wheel 217.

As illustrated in FIG. 3, in this embodiment, in the state where the pedal-driven vehicle 200 to which the hydraulic pressure control unit 1 is mounted is seen in the front view, the base body 10 does not have a region that is located in front of the front fork 216. In other words, in the state where the pedal-driven vehicle 200 to which the hydraulic pressure control unit 1 is mounted is observed in the direction of the axis 216a of the front fork 216, the base body 10 does not have the region that is located in front of the front fork 216.

As illustrated in FIG. 3, in this embodiment, in the state where the pedal-driven vehicle 200 to which the hydraulic pressure control unit 1 is mounted is seen in the front view, the base body 10 does not have a region that is located on an opposite side of the front fork 216 from the front wheel 217. In other words, in the state where the pedal-driven vehicle 200 to which the hydraulic pressure control unit 1 is mounted is observed in the direction of the axis 216a of the front fork 216, the base body 10 does not have the region that is located on the opposite side of the front fork 216 from the front wheel 217. Further in other words, in the state where the pedal-driven vehicle 200 to which the hydraulic pressure control unit 1 is mounted is seen in the front view, the base body 10 does not have a region that is arranged on an outer side of the front fork 216.

As illustrated in FIG. 3, in this embodiment, in the state where the pedal-driven vehicle 200 to which the hydraulic pressure control unit 1 is mounted is seen in the front view, the axis 61a of the first coil 61 and the axis 62a of the second coil 62 are located on a closer side to the front wheel 217 than the axis 216a of the front fork 216. In other words, in the state where the pedal-driven vehicle 200 to which the hydraulic pressure control unit 1 is mounted is observed in the direction of the axis 216a of the front fork 216, the axis 61a of the first coil 61 and the axis 62a of the second coil 62 are located on the closer side to the front wheel 217 than the axis 216a of the front fork 216.

As illustrated in FIG. 3, in this embodiment, in the state where the pedal-driven vehicle 200 to which the hydraulic pressure control unit 1 is mounted is seen in the front view, the base body 10 does not have a region that is located on an opposite side of the housing 40 from the front wheel 217. In other words, in the state where the pedal-driven vehicle 200 to which the hydraulic pressure control unit 1 is mounted is observed in the direction of the axis 216a of the front fork 216, the base body 10 does not have the region that is located on an opposite side of the housing 40 from the front wheel 217. That is, in the state where the pedal-driven vehicle 200 to which the hydraulic pressure control unit 1 is mounted is seen in the front view, the base body 10 does not have a portion that is projected to the front fork 216 side from the housing 40.

<Effects of Hydraulic Pressure Control Unit>

A description will be made on effects of the hydraulic pressure control unit according to the embodiment.

The hydraulic pressure control unit 1 according to this embodiment is the hydraulic pressure control unit 1 for the brake system 100 mounted to the pedal-driven vehicle 200 in which the front wheel 217 is held in the freely rotatable manner between the pair of the front forks 216 and capable of executing the anti-lock brake control. The hydraulic pressure control unit 1 is configured to store the brake fluid that is released from the wheel cylinder 251 during the depressurization in the anti-lock brake control in the accumulator 33 and to discharge the brake fluid in the accumulator 33 to the outside of the accumulator 33 in the pumpless manner. The hydraulic pressure control unit 1 includes the base body 10. The base body 10 is formed with: the master cylinder port 11, to which the fluid pipe 101 communicating with the master cylinder 242 is connected; the wheel cylinder port 12, to which the fluid pipe 102 communicating with the wheel cylinder 251 is connected; and the internal channel 13, which communicates the master cylinder port 11 and the wheel cylinder port 12 with each other. The hydraulic pressure control unit 1 is provided to the base body 10 and includes: the inlet valve 31 and the outlet valve 32 that open/close the internal channel 13 during the anti-lock brake control; the first coil 61 as the drive source of the inlet valve 31; the second coil 62 as the drive source of the outlet valve 32; and the circuit board 36 that is electrically connected to the first coil 61 and the second coil 62 and controls the energization of the first coil 61 and the second coil 62. The base body 10 is held by the front fork 216. In the state where the pedal-driven vehicle 200 to which the hydraulic pressure control unit 1 is mounted is seen in the front view, the circuit board 36 is located behind the front fork 216 and the base body 10, and the first coil 61 and the second coil 62 are erected from the rear surface 28 of the base body 10.

In the hydraulic pressure control unit, a length in an alignment direction of the inlet valve, the first coil, and the circuit board is long. In other words, in the hydraulic pressure control unit, a length in an alignment direction of the outlet valve, the second coil, and the circuit board is long. In the hydraulic pressure control unit, in a peripheral edge of the circuit board, a length in each direction in which a mounting surface of the circuit board extends (each of the axial direction Z and the width direction Y in this embodiment) is long. In the hydraulic pressure control unit 1 according to this embodiment, in the state where the pedal-driven vehicle 200 to which the hydraulic pressure control unit 1 is mounted is seen in the front view, the alignment direction of the inlet valve 31, the first coil 61, and the circuit board 36 matches a longitudinal direction. In other words, in the hydraulic pressure control unit 1 according to this embodiment, in the state where the pedal-driven vehicle 200 to which the hydraulic pressure control unit 1 is mounted is seen in the front view, the alignment direction of the outlet valve 32, the second coil 62, and the circuit board 36 matches the longitudinal direction. In the hydraulic pressure control unit 1 according to this embodiment, in the state where the pedal-driven vehicle 200 to which the hydraulic pressure control unit 1 is mounted is seen in the front view, the circuit board 36 is located behind the front fork 216. Accordingly, in the hydraulic pressure control unit 1 according to this embodiment, the dimension in the width direction Y of at least a part of the base body 10 can be made smaller than a clearance between the front fork 216 and the front wheel 217, and at least the part of the base body 10 can be arranged between the front fork 216 and the front wheel 217. Thus, when the pedal-driven vehicle 200 to which the hydraulic pressure control unit 1 according to this embodiment is mounted is seen in the front view, a region of the hydraulic pressure control unit 1 that is arranged on the outer side of the front fork 216 can be made smaller than the related art, and it is thus possible to suppress the hydraulic pressure control unit 1 from being applied with the external force in comparison with the related art. When the pedal-driven vehicle 200 to which the hydraulic pressure control unit 1 according to this embodiment is mounted is seen in the front view, the region of the hydraulic pressure control unit 1 that is arranged on the outer side of the front fork 216*c* can be made smaller than the related art. Thus, it is also possible to improve aesthetic appearance of the pedal-driven vehicle 200.

Preferably, in the state where the pedal-driven vehicle 200 to which the hydraulic pressure control unit 1 is mounted is seen in the front view, the first coil 61 and the second coil 62 are aligned in the axial direction Z that is parallel with the axis 216*a* of the front fork 216. With such a configuration, the dimension in the width direction Y of the base body 10 can be reduced, and the further large portion of the base body 10 can be arranged between the front fork 216 and the front wheel 217. Thus, when the pedal-driven vehicle 200 to which the hydraulic pressure control unit 1 configured just as described is mounted is seen in the front view, the region of the hydraulic pressure control unit 1 that is arranged on the outer side of the front fork 216 can be made further small. As a result, it is possible to further suppress the hydraulic pressure control unit 1 from being applied with the external force, and the aesthetic appearance of the pedal-driven vehicle 200 is further improved.

Preferably, the hydraulic pressure control unit 1 is provided to the base body 10 and includes the pressure sensor 103 that detects the pressure of the brake fluid. In the state where the pedal-driven vehicle 200 to which the hydraulic pressure control unit 1 is seen in the front view, the first coil 61, the second coil 62, and the pressure sensor 103 are aligned in the axial direction Z that is parallel with the axis 216*a* of the front fork 216. With such a configuration, even in the case where the hydraulic pressure control unit 1 includes the pressure sensor 103, the dimension in the width direction Y of the base body 10 can easily be reduced. Thus, even in the case where the hydraulic pressure control unit 1 includes the pressure sensor 103, when the pedal-driven vehicle 200 to which the hydraulic pressure control unit 1 is mounted is seen in the front view, the region of the hydraulic pressure control unit 1 that is arranged on the outer side of the front fork 216 can be made smaller than the related art, and it is thus possible to suppress the hydraulic pressure control unit 1 from being applied with the external force in comparison with the related art.

Preferably, in the state where the pedal-driven vehicle 200 to which the hydraulic pressure control unit 1 is mounted is seen in the front view, the base body 10 does not have the region that is located in front of the front fork 216. With such a configuration, it is possible to suppress a flipped stone or the like from hitting the hydraulic pressure control unit 1 during the travel of the pedal-driven vehicle 200, and it is possible to further suppress the hydraulic pressure control unit 1 from being applied with the external force.

Preferably, in the state where the pedal-driven vehicle 200 to which the hydraulic pressure control unit 1 is mounted is seen in the front view, the base body 10 does not have the region that is located on the opposite side of the front fork 216 from the front wheel 217. When the pedal-driven vehicle 200 to which the hydraulic pressure control unit 1 configured just as described is mounted is seen in the front view, the region of the hydraulic pressure control unit 1 that is arranged on the outer side of the front fork 216 can be made further small. As a result, it is possible to further suppress the hydraulic pressure control unit 1 from being applied with the external force, and the aesthetic appearance of the pedal-driven vehicle 200 is further improved.

Preferably, in the state where the pedal-driven vehicle 200 to which the hydraulic pressure control unit 1 is mounted is seen in the front view, the axis 61*a* of the first coil 61 and the axis 62*a* of the second coil 62 are located on the closer side to the front wheel 217 than the axis 216*a* of the front fork 216. With such a configuration, the further large portion of the base body 10 can be arranged between the front fork 216 and the front wheel 217. Thus, when the pedal-driven vehicle 200 to which the hydraulic pressure control unit 1 configured just as described is mounted is seen in the front view, the region of the hydraulic pressure control unit 1 that is arranged on the outer side of the front fork 216 can be made further small. As a result, it is possible to further suppress the hydraulic pressure control unit 1 from being applied with the external force, and the aesthetic appearance of the pedal-driven vehicle 200 is further improved.

Preferably, the terminal 63 is provided to the top surface 61*b* of the first coil 61, and the terminal 64 is provided to the top surface 62*b* of the second coil 62. The first coil 61 is electrically connected to the circuit board 36 via the terminal 63, and the second coil 62 is electrically connected to the circuit board 36 via the terminal 64. With such a configuration, it is possible to electrically connect the first coil 61 and the second coil 62 to the circuit board 36 while enlargement of the base body 10 in the width direction Y is suppressed. In this way, the dimension in the width direction Y of the base body 10 can be reduced, and the further large portion of the base body 10 can be arranged between the front fork 216 and the front wheel 217. Thus, when the pedal-driven vehicle 200 to which the hydraulic pressure control unit 1 configured just as described is mounted is seen in the front view, the region of the hydraulic pressure control unit 1 that is arranged on the outer side of the front fork 216 can be made further small. As a result, it is possible to further suppress the hydraulic pressure control unit 1 from being applied with the external force, and the aesthetic appearance of the pedal-driven vehicle 200 is further improved.

Preferably, in the state where the pedal-driven vehicle 200 to which the hydraulic pressure control unit 1 is mounted is seen in the front view, the master cylinder port 11 is formed in the upper surface 25 of the base body 10, and the wheel cylinder port 12 is formed in the lower surface 26 of the base body 10. With such a configuration, it is possible to form the master cylinder port 11 and the wheel cylinder port 12 in the base body 10 while the enlargement of the base body 10 in the width direction Y is suppressed. In addition, it is possible to suppress the fluid pipe 101, which is connected to the master cylinder port 11, and the fluid pipe 102, which is connected to the wheel cylinder port 12, from being projected in the width direction Y from the base body 10. Accordingly, the further large portion of the base body 10 can be arranged between the front fork 216 and the front wheel 217. Thus, when the pedal-driven vehicle 200 to which the hydraulic pressure control unit 1 configured just as described is mounted is seen in the front view, the region of the hydraulic pressure control unit 1 that is arranged on the outer side of the front fork 216 can be made further small. As a result, it is possible to further suppress the hydraulic pressure control unit 1 from being applied with the external force, and the aesthetic appearance of the pedal-driven vehicle 200 is further improved.

Preferably, the hydraulic pressure control unit 1 includes the housing 40 that is connected to the base body 10 and accommodates the first coil 61, the second coil 62, and the circuit board 36. In addition, in the state where the pedal-driven vehicle 200 to which the hydraulic pressure control unit 1 is mounted is seen in the front view, the base body 10 does not have the region that is located on the opposite side of the housing 40 from the front wheel 217. With such a configuration, the further large portion of the base body 10 can be arranged between the front fork 216 and the front wheel 217. Thus, when the pedal-driven vehicle 200 to which the hydraulic pressure control unit 1 configured just as described is mounted is seen in the front view, the region of the hydraulic pressure control unit 1 that is arranged on the outer side of the front fork 216 can be made further small. As a result, it is possible to further suppress the hydraulic pressure control unit 1 from being applied with the external force, and the aesthetic appearance of the pedal-driven vehicle 200 is further improved.

Preferably, the housing 40 includes the connector 48 that is electrically connected to the circuit board 36. In the state where the pedal-driven vehicle 200 to which the hydraulic pressure control unit 1 configured just as described is mounted is seen in the front view, the connector 48 is provided to at least one of the upper surface 41 and the lower surface 42 of the housing 40. With such a configuration, it is possible to suppress a connector of the cable that is connected to the connector 48 from being projected in the width direction Y from the base body 10. Accordingly, the further large portion of the base body 10 can be arranged between the front fork 216 and the front wheel 217. Thus, when the pedal-driven vehicle 200 to which the hydraulic pressure control unit 1 configured just as described is mounted is seen in the front view, the region of the hydraulic pressure control unit 1 that is arranged on the outer side of the front fork 216 can be made further small. As a result, it is possible to further suppress the hydraulic pressure control unit 1 from being applied with the external force, and the aesthetic appearance of the pedal-driven vehicle 200 is further improved.

Preferably, the internal channel 13 is configured not to be able to return the brake fluid in the accumulator 33 to the master cylinder port 11 without interposing the outlet valve 32. Conventionally, among the internal channels formed in the base body, the internal channel capable of returning the brake fluid in the accumulator to the master cylinder port without interposing the outlet valve is available. Such a conventional internal channel includes a bypass channel, one end of which is connected to the accumulator, and the other end of which is connected to the channel between the master cylinder and the inlet valve. In addition, in such a conventional internal channel, the bypass channel is provided with a check valve that restricts the flow of the brake fluid from the master cylinder side to the accumulator side in order to prevent the inflow of the brake fluid that has flowed into the internal channel from the master cylinder during braking into the accumulator through the bypass channel. This check valve is inserted in the accumulator from a lower end of the accumulator and is provided to an upper end portion of the accumulator. This check valve cannot be formed to have a small lateral width. Thus, the accumulator is also formed to have a large lateral width. That is, due to provision of this check valve, the dimension in the width direction Y of the base body is increased. To handle this problem, the internal channel 13 is configured not to be able to return the brake fluid in the accumulator 33 to the master cylinder port 11 without interposing the outlet valve 32. Thus, the above-described check valve is unnecessary. In this way, the dimension in the width direction Y of the base body 10 can be reduced, and the further large portion of the base body 10 can be arranged between the front fork 216 and the front wheel 217. Thus, when the pedal-driven vehicle 200 to which the hydraulic pressure control unit 1 configured just as described is mounted is seen in the front view, the region of the hydraulic pressure control unit 1 that is arranged on the outer side of the front fork 216 can be made further small. As a result, it is possible to further suppress the hydraulic pressure control unit 1 from being applied with the external force, and the aesthetic appearance of the pedal-driven vehicle 200 is further improved.

Preferably, only one pair of the inlet valve 31 and the outlet valve 32 is provided. The hydraulic pressure control unit, to which only one pair of the inlet valve and the outlet valve is provided, for the brake system of the single system is desired to be downsized and mounted to an obscure position in the straddle-type vehicle. Thus, the hydraulic pressure control unit 1 according to this embodiment is suitably used as the hydraulic unit for the brake system of the single system.

The description has been made so far on the embodiment. However, the present invention is not limited to the description of the embodiment. For example, the embodiment may only partially be implemented. In addition, for example, the portion by which the hydraulic pressure control unit according to the present invention is held is not limited to the front fork. Needless to say, the hydraulic pressure control unit according to the present invention may be held by a frame other than the front fork of the straddle-type vehicle, or the like. As described above, at least the part of the hydraulic pressure control unit according to the present invention can be arranged to a space that is conventionally unused. Therefore, even in the case where the hydraulic pressure control unit according to the present invention is held by the frame other than the front fork of the straddle-type vehicle, or the like, it is possible to suppress the hydraulic pressure control unit according to the present invention from being applied with the external force in comparison with the related art, and the aesthetic appearance of the straddle-type vehicle can be improved.

REFERENCE SIGNS LIST

1: Hydraulic pressure control unit
10: Base body
11: Master cylinder port
12: Wheel cylinder port
13: Internal channel
14: First channel
15: Second channel
16: Third channel
17: Fourth channel
18: Inlet valve recess
18a: First recess
18b: Second recess
18c: Upper end portion 19: Outlet valve recess
19a: First recess
19b: Second recess
19c: Upper end portion
22: Pressure sensor recess
23: Inlet valve notch
23a: Upper end portion
24: Outlet valve notch
24a: Upper end portion
25: Upper surface
26: Lower surface
27: Front surface
27a: Female screw
28: Rear surface
31: Inlet valve
32: Outlet valve
33: Accumulator
35: Control section
36: Circuit board
40: Housing
41: Upper surface
42: Lower surface
43: Front surface
44: Rear surface
45: First side surface
46: Second side surface
47: Inclined section
48: Connector
51: Main body
52: Opening
53: side
54: side
55: side
58: lid
61: First coil
61a: Axis
61b: Top surface
62: Second coil
62a: Axis
62b: Top surface
63: Terminal
64: Terminal
70: Bracket
71: Bolt
75: Jig
100: Brake system
101: Fluid pipe
102: Fluid pipe
103: Pressure sensor
200: Pedal-driven vehicle
210: Frame
211: Head tube
212: Top tube
213: Down tube
214: Seat tube
215: Stay
216: Front fork
216a: Axis
217: Front wheel
218: Saddle
219: Pedal
220: Rear wheel
230: Turning section
231: Steering column
232: Handlebar stem
233: Handlebar
240: Brake operation section
241: Brake lever
242: Master cylinder
243: Reservoir
250: Front-wheel braking section
251: Wheel cylinder
252: Rotor
260: Rear-wheel braking section
270: Power supply unit

What is claimed is:

1. A straddle-type vehicle (200) comprising:
a front wheel (217) that is held in a freely rotatable manner by a front fork (216);
a brake system (100) that includes a hydraulic pressure control unit (1) and capable of executing anti-lock brake control,
the hydraulic pressure control unit (1) comprising:
a base body (10) formed with: a master cylinder port (11) to which a fluid pipe (101) communicating with a master cylinder (242) is connected; a wheel cylinder port (12) to which a fluid pipe (102) communicating with a wheel cylinder (251) is connected; and an internal channel (13) that communicates the master cylinder port (11) and the wheel cylinder port (12) with each other;
an inlet valve (31) and an outlet valve (32) that are provided to the base body (10) and open/close the internal channel (13) during the anti-lock brake control;
a first coil (61) as a drive source of the inlet valve (31);
a second coil (62) as a drive source of the outlet valve (32);
a circuit board (36) that is electrically connected to the first coil (61) and the second coil (62) and configured to control energization of the first coil (61) and the second coil (62); and
an accumulator (33),
wherein the hydraulic pressure control unit (1) is configured to store a brake fluid that is released from a wheel cylinder (251) during depressurization in the anti-lock brake control in an accumulator (33) and to discharge the brake fluid in the accumulator (33) to outside of the accumulator (33) in a pumpless manner,
wherein the base body (10) is held by the front fork (216), and
in a state where the straddle-type vehicle (200), to which the hydraulic pressure control unit (1) is mounted, is seen in a front view, the circuit board (36) is located behind the front fork (216) and the base body (10), and the first coil (61) and the second coil (62) are erected from a rear surface (28) of the base body (10).

2. The straddle-type vehicle (200) according to claim 1, wherein
at least a part of the base body (10) is located between the front fork (216) and the front wheel (217).

3. The straddle-type vehicle (200) according to claim 2, wherein
in the state where the straddle-type vehicle (200), to which the hydraulic pressure control unit (1) is mounted, is seen in the front view, the base body (10) does not have a region that is located in front of the front fork (216).

4. The straddle-type vehicle (200) according to claim 2, wherein
in the state where the straddle-type vehicle (200), to which the hydraulic pressure control unit (1) is mounted, is seen in the front view, the base body (10) does not have a region that is located on an opposite side of the front fork (216) from the front wheel (217).

5. The straddle-type vehicle (200) according to claim 4, wherein
in the state where the straddle-type vehicle (200), to which the hydraulic pressure control unit (1) is mounted, is seen in the front view, an axis (61*a*) of the first coil (61) and an axis (62*a*) of the second coil (62) are located on a closer side to the front wheel (217) than an axis (216*a*) of the front fork (216).

6. The straddle-type vehicle (200) according to claim 2, wherein an entirety of the base body (10) is located between the front fork (216) and the front wheel (217).

7. The straddle-type vehicle (200) according to claim 1, wherein
in the state where the straddle-type vehicle (200), to which the hydraulic pressure control unit (1) is mounted, is seen in the front view, the first coil (61) and the second coil (62) are aligned in a parallel direction (Z) with an axis (216*a*) of the front fork (216).

8. The straddle-type vehicle (200) according to claim 7, wherein the hydraulic pressure control unit (1) further comprises:
a pressure sensor (103) that is provided to the base body (10) and detects a pressure of the brake fluid, wherein
in the state where the straddle-type vehicle (200), to which the hydraulic pressure control unit (1) is mounted, is seen in the front view, the first coil (61), the second coil (62), and the pressure sensor (103) are aligned in the parallel direction (Z) with the axis (216*a*) of the front fork (216).

9. The straddle-type vehicle (200) according to claim 1, wherein the hydraulic pressure control unit (1) further comprises:
a housing (40) that is connected to the base body (10) and accommodates the first coil (61), the second coil (62), and the circuit board (36), wherein
in the state where the straddle-type vehicle (200), to which the hydraulic pressure control unit (1) is mounted, is seen in the front view, the base body (10) does not have a region that is located on an opposite side of the housing (40) from the front wheel (217).

10. The straddle-type vehicle (200) according to claim 9, wherein
the housing (40) includes a connector (48) that is electrically connected to the circuit board (36), wherein
in the state where the straddle-type vehicle (200), to which the hydraulic pressure control unit (1) is mounted, is seen in the front view, the connector (48) is provided to at least one of an upper surface (41) and a lower surface (42) of the housing (40).

11. The straddle-type vehicle (200) according to claim 1, wherein
a terminal (63, 64) is provided to a top surface (61*b*, 62*b*) of each of the first coil (61) and the second coil (62), and
each of the first coil (61) and the second coil (62) is electrically connected to the circuit board (36) via the terminal (63, 64).

12. The straddle-type vehicle (200) according to claim 1, wherein
in the state where the straddle-type vehicle (200), to which the hydraulic pressure control unit (1) is mounted, is seen in the front view, the master cylinder port (11) is formed in an upper surface (25) of the base body (10), and
the wheel cylinder port (12) is formed in a lower surface (26) of the base body (10).

13. The straddle-type vehicle (200) according to claim 1, wherein
the internal channel (13) is configured not to be able to return the brake fluid in the accumulator (33) to the master cylinder port (11) without interposing the outlet valve (32).

14. The straddle-type vehicle (200) according to claim 1, wherein
only one pair of the inlet valve (31) and the outlet valve (32) is provided.

\* \* \* \* \*